United States Patent
Brandt et al.

(10) Patent No.: US 9,682,781 B2
(45) Date of Patent: Jun. 20, 2017

(54) PASSIVE OCCUPANT RESTRAINT FOR SIDE-FACING AIRCRAFT SEATS

(71) Applicant: Sikorsky Aircraft Corporation, Stratford, CT (US)

(72) Inventors: Michael David Brandt, Suamico, WI (US); Christopher Erin Mathena, Vancouver, WA (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 12 days.

(21) Appl. No.: 14/805,635

(22) Filed: Jul. 22, 2015

(65) Prior Publication Data

US 2016/0023764 A1     Jan. 28, 2016

Related U.S. Application Data

(60) Provisional application No. 62/027,452, filed on Jul. 22, 2014.

(51) Int. Cl.
| | |
|---|---|
| *A47D 15/00* | (2006.01) |
| *B64D 11/06* | (2006.01) |
| *B60N 2/00* | (2006.01) |
| *B60N 2/42* | (2006.01) |
| *B60N 2/427* | (2006.01) |

(Continued)

(52) U.S. Cl.
CPC ............. *B64D 11/062* (2014.12); *B60N 2/00* (2013.01); *B60N 2/4235* (2013.01); *B60N 2/42727* (2013.01); *B60N 2/449* (2013.01); *B60R 22/00* (2013.01)

(58) Field of Classification Search
CPC ................................................ B60N 2002/022
USPC ........ 297/466, 216.13, 411.2, 411.3, 411.31, 297/411.36, 411.37, 423.17, 423.22, 297/423.28, 391, 394, 396, 403, 404, 406, 297/410
See application file for complete search history.

(56) References Cited

U.S. PATENT DOCUMENTS

| | | | | | |
|---|---|---|---|---|---|
| 3,100,129 | A | * | 8/1963 | Adolphson | ............ A61G 13/12 |
| | | | | | 297/423.22 |
| 3,498,671 | A | * | 3/1970 | Coon | ................... B60N 2/4858 |
| | | | | | 297/397 |

(Continued)

FOREIGN PATENT DOCUMENTS

JP            06219200 A   *   8/1994

*Primary Examiner* — Laurie K Cranmer
(74) *Attorney, Agent, or Firm* — Cantor Colburn LLP

(57) ABSTRACT

In one aspect, a side-facing seat assembly is provided. The seat assembly includes a seat portion, a back portion having an upper surface extending along the width of the back portion, and an arm restraint assembly coupled to the back portion. The arm restraint assembly includes a rotating bar rotatable between a stowed position oriented with the back portion upper surface and a deployed position. In the deployed position the rotating bar extends from the back portion and facilitates restraining an occupant seated in the seat assembly. The seat assembly further includes a leg restraint assembly coupled to the seat portion. The leg restraint assembly includes an extension bar extendable between a stowed position oriented with the seat portion and a deployed position. In the deployed position the extension bar extends from the seat portion and facilitates restraining an occupant seated in the seat assembly.

20 Claims, 4 Drawing Sheets

(51) Int. Cl.
B60N 2/44 (2006.01)
B60R 22/00 (2006.01)

(56) References Cited

U.S. PATENT DOCUMENTS

| | | | | |
|---|---|---|---|---|
| 4,065,180 A * | 12/1977 | Karay | ............ | A61G 5/10 297/466 |
| 4,247,064 A * | 1/1981 | Schulman | ............ | B64D 25/02 244/122 AG |
| 4,822,102 A * | 4/1989 | Duvenkamp | ............ | B60N 2/487 297/403 |
| 4,881,777 A * | 11/1989 | Dorshimer | ............ | B60N 2/487 297/397 |
| 5,050,933 A * | 9/1991 | Tornero | ............ | A47C 7/543 248/118.3 |
| 5,145,197 A * | 9/1992 | Gatti | ............ | A61G 5/08 188/2 F |
| 5,171,317 A * | 12/1992 | Corcoran | ............ | A61H 1/0218 297/411.31 |
| 5,342,116 A * | 8/1994 | Walton | ............ | A47C 7/506 297/423.12 |
| 5,346,282 A * | 9/1994 | De Filippo | ............ | B60N 2/487 297/395 |
| 5,370,446 A * | 12/1994 | Bancod | ............ | A47C 7/38 297/220 |
| 6,412,864 B1 | 7/2002 | Larson | | |
| 6,659,553 B2 * | 12/2003 | Achleitner | ............ | B60N 2/449 297/250.1 |
| 7,178,874 B2 * | 2/2007 | Demski | ............ | A47C 7/38 297/391 |
| 7,226,131 B2 | 6/2007 | Meneses et al. | | |
| 7,240,943 B2 | 7/2007 | Williamson et al. | | |
| 7,487,989 B2 * | 2/2009 | Crosby, II | ............ | A61G 5/12 280/250.1 |
| 7,703,854 B2 * | 4/2010 | LaFreniere | ............ | A47C 7/546 297/31 |
| 7,824,349 B2 * | 11/2010 | Lv | ............ | A61H 7/007 297/423.21 |
| 8,955,914 B2 * | 2/2015 | Meister | ............ | B60N 2/42727 244/122 AG |
| 8,998,335 B2 * | 4/2015 | Buehlmeyer | ............ | B60N 2/38 297/383 |
| 9,120,405 B2 * | 9/2015 | Buehlmeyer | ............ | B60N 2/4855 |
| 9,216,676 B1 * | 12/2015 | Reyes Luna | ............ | B60N 2/449 |
| 9,221,362 B2 * | 12/2015 | Schneider | ............ | B60N 2/2209 |
| 2002/0167207 A1 * | 11/2002 | Larson | ............ | B60N 2/242 297/216.1 |
| 2003/0155797 A1 * | 8/2003 | Amirault | ............ | B60N 2/2851 297/250.1 |
| 2013/0134753 A1 * | 5/2013 | Buehlmeyer | ............ | B60N 2/38 297/284.1 |
| 2013/0175837 A1 * | 7/2013 | Buehlmeyer | ............ | B60N 2/4855 297/284.1 |
| 2014/0021771 A1 | 1/2014 | Meister et al. | | |
| 2014/0159356 A1 | 6/2014 | Kastelic et al. | | |
| 2016/0009205 A1 * | 1/2016 | Reyes Luna | ............ | B60N 2/449 297/403 |

* cited by examiner

PASSIVE OCCUPANT RESTRAINT FOR SIDE-FACING AIRCRAFT SEATS

CROSS-REFERENCE TO RELATED APPLICATIONS

This application claims the benefit of U.S. provisional patent application Ser. No. 62/027,452, filed Jul. 22, 2014, the entire contents of which are incorporated herein by reference.

BACKGROUND

The subject matter disclosed herein generally relates to restraint systems for vehicles, and more specifically, to restraint systems for side-facing aircraft seats.

Some aircraft may include seating devices referred to as divans to accommodate one or more passengers within the aircraft. Divans are generally couch-like structures where one or more passengers can comfortably sit in a less formal, customized environment different from that typically utilized in commercial, passenger aircraft. The interior of such aircraft may include individual seats and divans installed in the aircraft in a side-facing orientation. Due to their orientation, some side-facing passenger seats may not provide sufficient occupant restraint during a crash. Known solutions include active airbag systems or rigid walls. However, airbag systems add significant weight and cost, diminish aesthetics of seat belts, and add a large certification burden to the installer. Active systems also increase cost of life cycle operation and maintenance.

Accordingly, it is desirable to provide a simple and cost-efficient passive restraint system for side-facing vehicle seats.

BRIEF SUMMARY

In one aspect, a seat assembly is provided. The seat assembly includes a seat portion, a back portion having an upper surface, and an arm restraint assembly coupled to the back portion. The arm restraint assembly includes a rotating bar rotatable between a stowed position oriented along the upper surface and a deployed position. In the deployed position the rotating bar extends from the back portion and facilitates restraining an occupant seated in the seat assembly.

In another aspect, a seat assembly is provided. The seat assembly includes a seat portion, a back portion, and a leg restraint assembly coupled to the seat portion. The leg restraint assembly includes an extension bar extendable between a stowed position oriented with the seat portion and a deployed position. In the deployed position the extension bar extends from the seat portion and facilitates restraining an occupant seated in the seat assembly.

In yet another aspect, a side-facing seat assembly is provided. The seat assembly includes a seat portion, a back portion having an upper surface extending along the width of the back portion, and an arm restraint assembly coupled to the back portion. The arm restraint assembly includes a rotating bar rotatable between a stowed position oriented with the back portion upper surface and a deployed position. In the deployed position the rotating bar extends from the back portion and facilitates restraining an occupant seated in the seat assembly. The seat assembly further includes a leg restraint assembly coupled to the seat portion. The leg restraint assembly includes an extension bar extendable between a stowed position oriented with the seat portion and a deployed position. In the deployed position the extension bar extends from the seat portion and facilitates restraining an occupant seated in the seat assembly.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Described herein are restraint systems for side-facing vehicle seats. The system includes a first structure to restrain an occupant's torso and a second structure to restrain an occupant's legs. The first structure deploys on the forward side of the occupant's shoulder/arm, and is deployed in addition to safety belts during taxi, takeoff, and landing. The first structure is hidden within the top of the seat back and pops up from the seat back and rotates into place manually by the occupant of the seat. The second structure deploys on the forward side of the occupant's legs and is hidden within a lower portion of the seat. The second structure is withdrawn from the seat and rotates into place manually by the occupant. The first structure sits mid-arm on the occupant and the second structure sits mid-leg on the occupant. As such, the restraint system closely restrains the occupant to the seat structure during a crash, thereby preventing potential injury.

Figure 1:
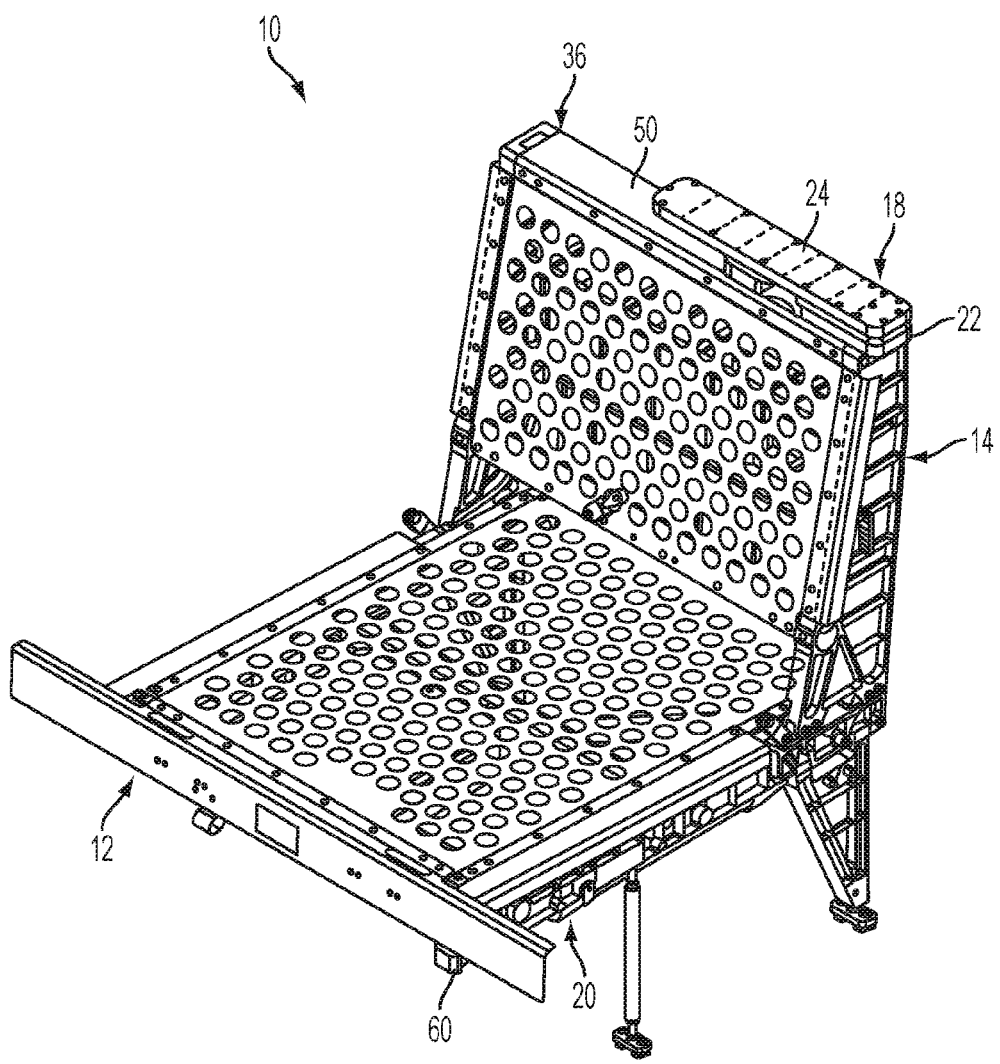
FIG. 1 is a perspective view of an exemplary vehicle seat in a first position.
Figure 2:
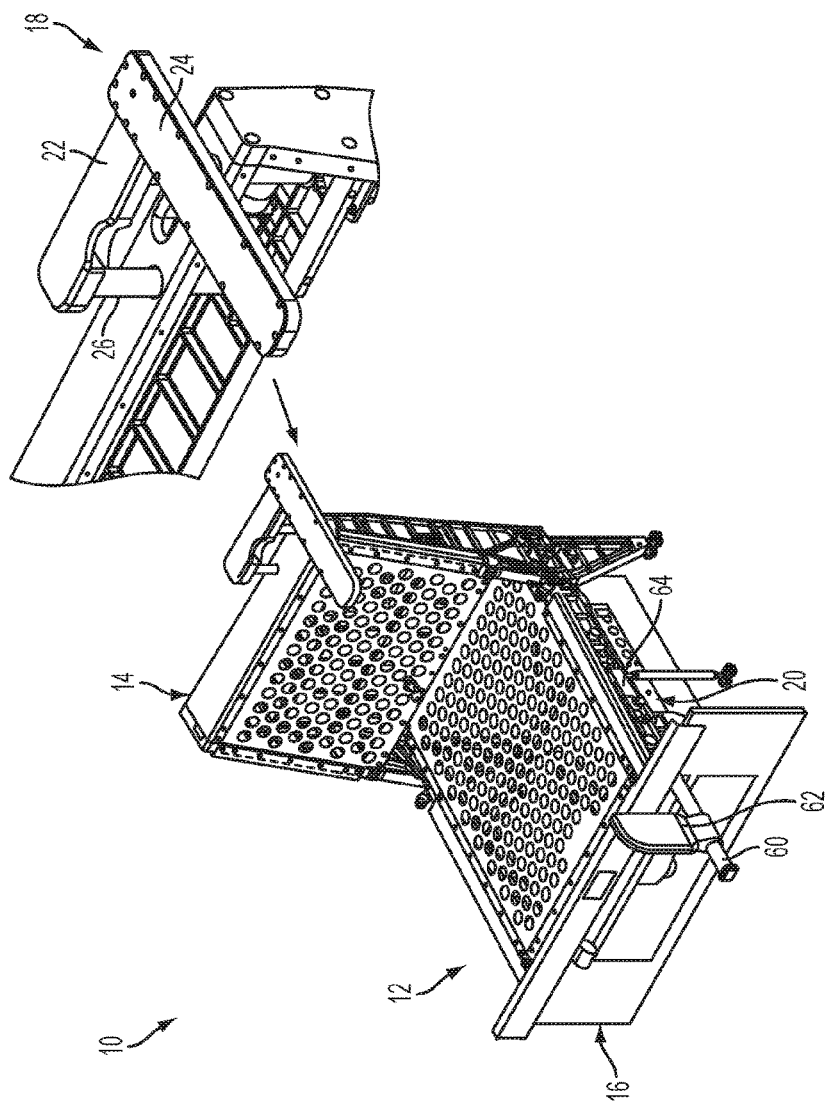
FIG. 2 is a perspective view of the vehicle seat shown in FIG. 1 in a second position.

FIGS. 1 and 2 illustrate an exemplary seat assembly 10 that generally includes a seat portion 12, a back portion 14, and drawer assembly 16 (FIG. 2). In the exemplary embodiment, seat assembly 10 includes an arm restraint assembly 18 and a leg restraint assembly 20. Restraint assemblies 18, 20 are illustrated in a stowed position in FIG. 1 and in a deployed position in FIG. 2.

Figure 4:
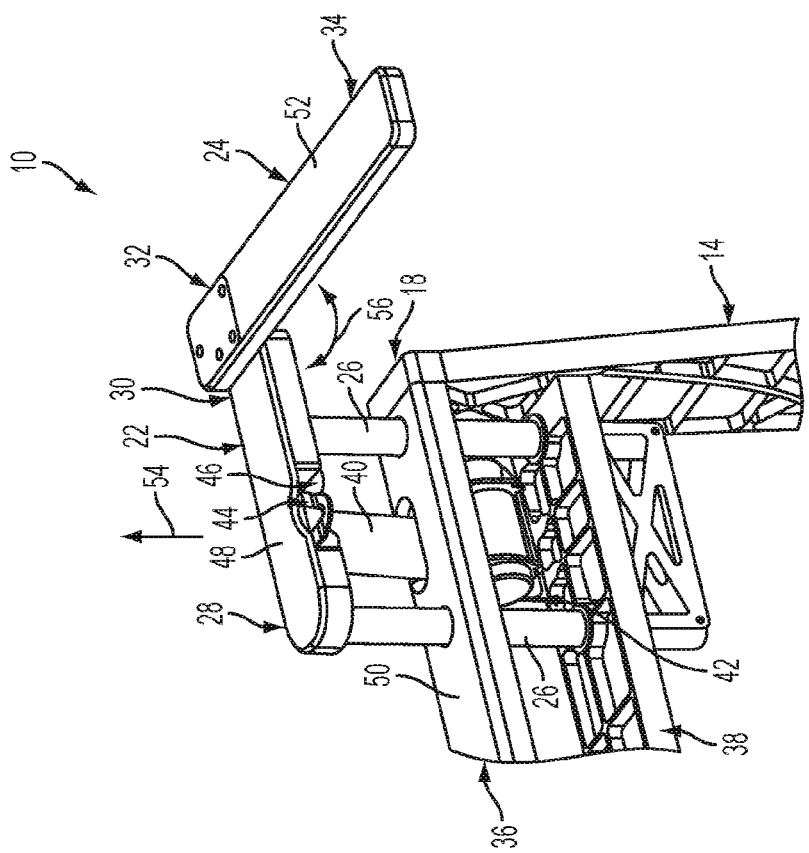
FIG. 4 is a perspective view of the arm restraint assembly shown in FIG. 3 in the second position.
Figure 3:
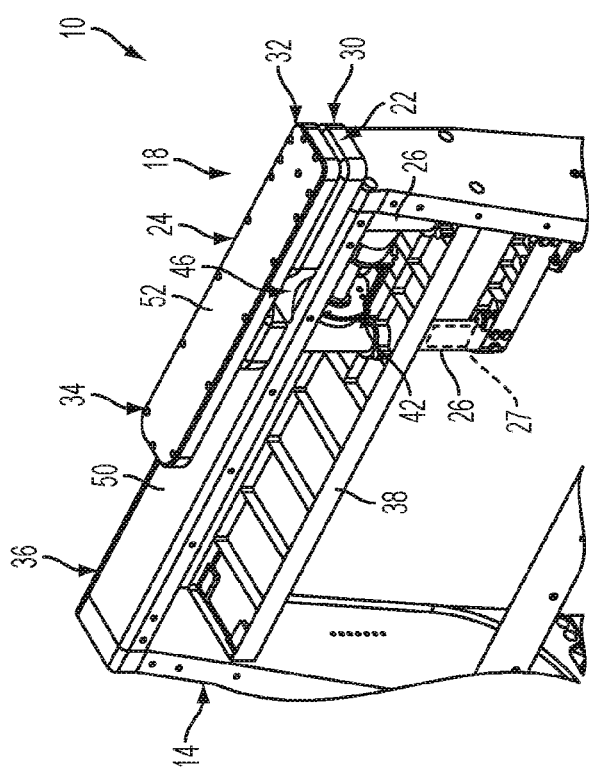
FIG. 3 is a perspective view of an exemplary arm restraint assembly of the seat shown in FIG. 1 in the first position.

FIGS. 3 and 4 respectively illustrate arm restraint assembly 18 in more detail in the stowed and deployed positions. In the exemplary embodiment, arm restraint assembly 18 generally includes a fixed bar 22, a rotating bar 24, and support tubes 26. Fixed bar 22 includes a first end 28 and a second end 30, and rotating bar 24 similarly includes a first end 32 and a second end 34. Rotating bar first end 32 is rotatably coupled to fixed bar second end 30 for movement between the stowed position (FIG. 3) and the deployed position (FIG. 4). Support tubes 26 are coupled to fixed bar 22 and extend through an upper plate 36 and a lower plate 38 of seat assembly 10. However, assembly 18 may be arranged in any suitable location in or on back portion 14. In the exemplary embodiment, support tubes 26 are operatively associated with one or more biasing mechanisms 27 such as one or more gas springs to selectively deploy arm restraint assembly 18. For example, the biasing mechanisms 27 may be positioned within support tubes 26.

In the exemplary embodiment, restraint assembly 18 includes a seat belt 40 and inertial locking reel 42 associated therewith. Seat belt 40 extends through upper plate 36 and includes a first end (not shown) engaged with inertial locking reel 42, and a second end 44 extending through fixed bar 22 and extractable from a belt compartment 46 defined in fixed bar 22.

In operation, arm restraint assembly 18 begins in the stowed position shown in FIG. 3 with rotating bar 24 oriented on a top surface 48 of fixed bar 22, and fixed bar 22 is oriented on a top surface 50 of upper plate 36. In this position, rotating bar 24 and fixed bar 22 are in parallel or substantially in parallel to define a compact, low profile stow position. Seat assembly 10 may include one or more cushions or padding (not shown) to conceal arm restraint assembly 18 when in the stowed position. Additionally, fixed bar 22 and/or rotating bar 24 may be padded and upholstered.

When use of arm restraint assembly 18 is required, an occupant may push on a top surface 52 of rotating bar 24, and the biasing mechanism 27 biases and extends support tubes 26 and fixed bar 22 upward and away from upper plate 36 in the direction of arrow 54. With fixed bar 22 extended, the occupant may rotate bar 24 outward and away from fixed bar 22 in the direction of arrow 56. In the exemplary embodiment, bar 24 is rotated approximately 90° until it is perpendicular to or substantially perpendicular to fixed bar 22. Rotatable bar 24 may then be locked into position relative to fixed bar 22 using a locking assembly (not shown) or otherwise be prevented from further rotation in the direction of arrow 56. As such, rotatable bar 24 is deployed and positioned to support the occupant during a crash event.

Once fixed bar 22 is extended, shoulder harness belt 40 is accessible from compartment 46. The occupant may extend belt 40 the appropriate length and subsequently secure belt second end 44 in a buckle mechanism (not shown) in a manner well known in the art. This may be done prior to or after deployment of rotatable bar 24.

Figure 5:
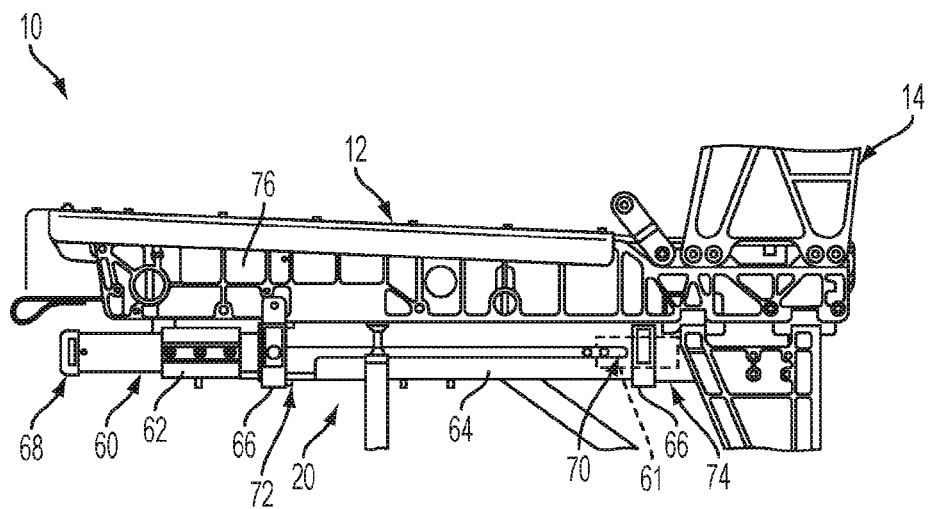
FIG. 5 is a side view of an exemplary leg restraint assembly of the seat shown in FIG. 1 in the first position.
Figure 6:
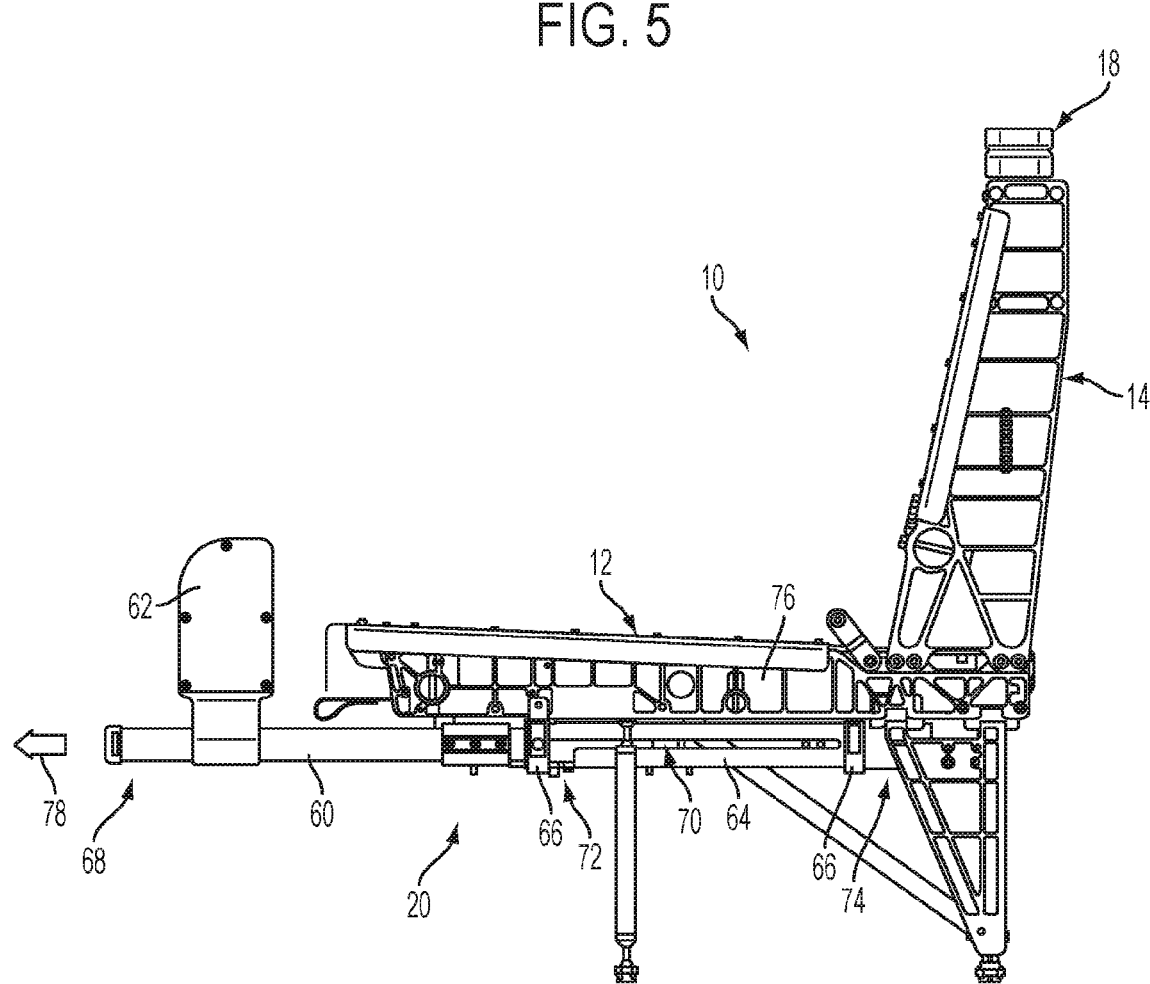
FIG. 6 is a side view of the leg restraint assembly shown in FIG. 5 in the second position.

FIGS. 5 and 6 respectively illustrate leg restraint assembly 20 in more detail in the stowed and deployed positions. In the exemplary embodiment, leg restraint assembly 20 generally includes an extension bar 60, a restraint member 62, a support sleeve 64, and bearings 66. Extension bar 60 includes a first end 68 and a second end 70, and support sleeve 64 is tubular and includes a first end 72 and a second end 74. Restraint member 62 is coupled to extension bar first end 68, and extension bar second end 70 extends into support sleeve first end 72. Extension bar 60 is slidably received within support sleeve 64 and slidably moves on bearings 66 between the stowed position (FIG. 5) and the deployed position (FIG. 6). Support sleeve 64 is coupled to a side plate 76 of seat assembly 10. In the exemplary embodiment, extension bar 60 is operatively associated with one or more biasing mechanisms 61 such as one or more gas springs to selectively deploy extension bar 60 from support sleeve 64.

In operation, leg restraint assembly 20 begins in the stowed position shown in FIG. 5 with extension bar 60 oriented within support sleeve 64 beneath seat portion 12 and/or along side plate 76. However, assembly 20 may be arranged in any suitable location in or on seat portion 12. Extension bar 60 is oriented such that restraint member 62 extends parallel to or substantially parallel to seat portion 12. In this position, extension bar 60 and restraint member 62 are stowed and concealed beneath seat portion 12. Seat assembly 10 may include one or more cushions or padding (not shown) to further conceal leg restraint assembly 20 when in the stowed position. Additionally, extension bar 60 and/or restraint member 62 may be padded and upholstered.

When use of leg restraint assembly 20 is required, an occupant may push on extension bar first end 68 and a biasing mechanism 61 biases and extends bar 60 outward from support sleeve 64 away from second end 74 in the direction of arrow 78. With bar 60 extended, the occupant may rotate or twist bar 60 away from seat assembly 10 to rotate restraint member 62. Alternatively, restraint member 62 may be rotatably coupled to extension bar 60. In the exemplary embodiment, extension bar 60 is rotated approximately 90° until restraint member 62 is perpendicular to or substantially perpendicular to seat portion 12. Extension bar 60 may then be locked into position relative to support sleeve 64 using a locking assembly (not shown) or otherwise be prevented from further rotation of restraint member 62 away from seat portion 12. As such, restraint member 62 is deployed and positioned to support the occupant's legs during a crash event.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A seat assembly comprising:
a seat portion;
a back portion having an upper surface; and
an arm restraint assembly coupled to the back portion, the arm restraint assembly including a rotationally fixed bar and a rotating bar, the rotationally fixed bar having a first end and a second end, the rotationally fixed bar vertically movable between a stowed position oriented along the upper surface of the back portion and a deployed position vertically spaced from the upper surface of the back portion, the rotating bar having a first end and a second end, the first end of the rotating bar pivotally connected to the second end of the rotationally fixed bar, the rotating bar rotatable between a stowed position oriented along an upper surface of the rotationally fixed bar and a deployed position, wherein in the deployed position of the rotating bar, the rotating bar rotationally extends from the back portion and facilitates restraining an occupant seated in the seat assembly.

2. The seat assembly of claim 1, wherein the arm restraint assembly further comprises at least one support tube coupled to the rotationally fixed bar and the back portion, the at least one support tube movable between a stowed position oriented within the back portion and a deployed position, wherein in the deployed position at least a portion of the at least one support tube extends from within the back portion away from the upper surface.

3. The seat assembly of claim 2, wherein the arm restraint assembly further comprises a biasing mechanism to bias the at least one support tube into the deployed position.

4. The seat assembly of claim 1, further comprising a leg restraint assembly coupled to the seat portion, the leg restraint assembly including a longitudinally movable extension bar and a restraint member coupled to the extension bar, the restraint member rotatable between a stowed position and a deployed position, wherein in the deployed position the restraint member facilitates restraining an occupant seated in the seat assembly.

5. The seat assembly of claim 1, wherein the rotationally fixed bar is at least substantially flush with the upper surface of the back portion in the stowed position of the rotationally fixed bar, and the rotating bar is at least substantially flush with the rotationally fixed bar in the stowed position of the rotating bar.

6. The seat assembly of claim 5, wherein the upper surface of the back portion is substantially planar and the upper surface of the rotationally fixed bar is substantially planar.

7. The seat assembly of claim 1, further comprising a seat belt extending through the rotationally fixed bar.

8. The seat assembly of claim 7, wherein the rotationally fixed bar includes a belt compartment, the seat belt accessible from the belt compartment when the rotationally fixed bar is deployed.

9. The seat assembly of claim 1, further comprising a seat belt and inertial locking reel, the inertial locking reel disposed at the back portion, and the seat belt accessible when the rotationally fixed bar is deployed.

10. The seat assembly of claim 9, wherein the seat belt passes through the upper surface of the back portion.

11. The seat assembly of claim 10, wherein the seat belt extends through the rotationally fixed bar.

12. A seat assembly comprising:
a seat portion;
a side plate extending downwardly from the seat portion;
a back portion; and
a leg restraint assembly coupled to the seat portion, the leg restraint assembly including an extension bar and a restraint member coupled to the extension bar, the extension bar longitudinally extendable along the side plate between a stowed position oriented with the seat portion and a deployed position, the restraint member rotatable from a stowed position, substantially parallel to the seat portion and substantially perpendicular to the side plate, to a deployed position, substantially parallel to the side plate and substantially perpendicular to the seat portion, wherein in the deployed position of the extension bar, the extension bar extends from the seat portion and in the deployed position of the restraint member, the restraint member facilitates restraining an occupant seated in the seat assembly.

13. The seat assembly of claim 12, wherein the leg restraint assembly further comprises a biasing mechanism to bias the extension bar into the deployed position.

14. The seat assembly of claim 12, further comprising an arm restraint assembly coupled to the back portion, the arm restraint assembly including a rotating bar and a rotationally fixed bar, the rotationally fixed bar movable between a stowed position oriented along the upper surface and a deployed position, wherein in the deployed position the fixed bar is spaced from the back portion, the rotating bar rotatably coupled to the fixed bar.

15. The seat assembly of claim 14, further comprising a seat belt extending through the fixed bar.

16. The seat assembly of claim 12, wherein the leg restraint assembly further comprises a support sleeve coupled to the side plate, the support sleeve slidably receiving the extension bar therein.

17. The seat assembly of claim 12, wherein the leg restraint assembly further comprises at least one bearing operatively associated with the extension bar and configured to facilitate sliding movement of the extension bar between the stowed position and the deployed position.

18. A side-facing seat assembly comprising:
a seat portion;
a back portion having an upper surface extending along a width of the back portion;
an arm restraint assembly coupled to the back portion, the arm restraint assembly including a rotating bar and a rotationally fixed bar, the rotationally fixed bar vertically movable between a stowed position and a deployed position on the upper surface of the back portion, the rotating bar rotatable with respect to the rotationally fixed bar between a stowed position oriented with the back portion upper surface and rotationally fixed bar and a deployed position, wherein in the deployed position of the rotating bar, the rotating bar extends from the back portion and facilitates restraining an occupant seated in the seat assembly;
a seat belt coupled to the arm restraint assembly; and
a leg restraint assembly coupled to the seat portion, the leg restraint assembly including an extension bar and a rotatable restraint member coupled to the extension bar, the leg restraint assembly extendable between a stowed position oriented with the seat portion and a deployed position, wherein in the deployed position the extension bar extends from the seat portion and the restraint member facilitates restraining an occupant seated in the seat assembly.

19. The seat assembly of claim 18, wherein the arm restraint assembly further comprises a first biasing mechanism to bias the rotationally fixed bar into the deployed position, and the leg restraint assembly further comprises a second biasing mechanism to bias the extension bar into the deployed position.

20. The seat assembly of claim 18, wherein the seat belt extends through the rotationally fixed bar.

\* \* \* \* \*